(12) United States Patent
Giotta et al.

(10) Patent No.: US 8,255,597 B2
(45) Date of Patent: Aug. 28, 2012

(54) INTERFACING DEVICE AND METHOD, FOR EXAMPLE FOR SYSTEMS-ON-CHIP

(75) Inventors: Francesco Giotta, Catania (IT);
Salvatore Pisasale, Catania (IT);
Giuseppe Falconeri, Sant'Agata li Battiati (Catania) (IT)

(73) Assignee: STMicroelectronics S.R.L., Agrate Brianza (MI) (IT)

( * ) Notice: Subject to any disclaimer, the term of this patent is extended or adjusted under 35 U.S.C. 154(b) by 0 days.

(21) Appl. No.: 12/833,451

(22) Filed: Jul. 9, 2010

(65) Prior Publication Data

US 2011/0022745 A1 Jan. 27, 2011

(30) Foreign Application Priority Data

Jul. 23, 2009 (IT) .............................. TO2009A0559

(51) Int. Cl.
*G06F 3/00* (2006.01)
*G06F 5/00* (2006.01)
(52) U.S. Cl. ........................... 710/51; 716/138; 370/359
(58) Field of Classification Search .................... 710/15, 710/51
See application file for complete search history.

(56) References Cited

U.S. PATENT DOCUMENTS

| 6,367,067 | B1 * | 4/2002 | Odani et al. ................... 717/154 |
| 6,578,097 | B1 * | 6/2003 | Lin et al. ........................ 710/107 |
| 6,768,557 | B1 * | 7/2004 | Minowa et al. ............... 358/1.15 |
| 6,834,378 | B2 | 12/2004 | Augsburg et al. ................. 716/6 |
| 7,069,370 | B2 * | 6/2006 | Sukegawa et al. ............. 710/305 |
| 7,266,632 | B2 * | 9/2007 | Dao et al. ....................... 710/317 |
| 2005/0152197 | A1 * | 7/2005 | Cho et al. ....................... 365/221 |
| 2008/0162974 | A1 * | 7/2008 | Keys ............................. 713/400 |

* cited by examiner

*Primary Examiner* — Elias Mamo
(74) *Attorney, Agent, or Firm* — Allen, Dyer, Doppelt, Milbrath & Gilchrist, P.A.

(57) ABSTRACT

An interface device, such as for a System-on-Chip (SoC) bus, transfers data from an input queue through an output to a target. The interface device includes a buffer network for buffering input data when the target is not available for receiving the data. A multiplexer switches between a first operating condition for directing to the target the data from the input queue, and a second operating condition for directing to the target the buffered data from the buffer network. A finite-state machine selectively switches the multiplexer between the first operating condition and the second operating condition based on an acknowledgement signal received from the target. This indicates the availability of the target for receiving the data.

28 Claims, 2 Drawing Sheets

INTERFACING DEVICE AND METHOD, FOR EXAMPLE FOR SYSTEMS-ON-CHIP

FIELD OF THE INVENTION

The present disclosure relates to interfacing techniques, and in particular, to an interfacing technique for use with buses of the System-on-Chip (SoC) type.

BACKGROUND OF THE INVENTION

In the design of a System-on-Chip (SoC), the digital part can be treated by partitioning into various sub-systems. Each sub-system satisfies respective given constraints in regards to the interface boundary so that in the integration stage it is possible to obtain the "timing closure" in a straightforward way. For example, an important constraint is that the interface signals can come directly from flip-flops without assuming output delays in this layer.

Satisfying this constraint is generally possible, but in the case of the control paths, important aspects can arise. These aspects are linked to the possible presence, between two parts of the system, of logic alone so as to reduce latency. This can create integration problems for high-frequency applications and when the Intellectual Property (IP) modules communicate with the bus using a protocol with request-grant validation. In this way, the IP modules prepare new data using the slow grant signal coming from the bus.

Techniques of a first-in first-out (FIFO) type using a fixed output position may be used. In this case, the function of timing closure is simpler in that the grant signal coming from the bus is loaded only in this module.

However, there are disadvantages associated with this approach. In particular, the presence of a specific FIFO scheme renders loading of the data in the read stage more complex. Furthermore, the function of timing closure is satisfactory on the data path but the shift operation for shifting the data in the fixed location imposes a certain load on the grant signal, which is assumed to arrive with a delay from the bus.

Other approaches use FIFO schemes on two locations to overload the ACK signal only in the selection of one of the two data locations through updating of a read pointer. However, these approaches are important in regards to management of the pointers. There is a risk of injecting "bugs" in the overflow/underflow of the pointers themselves. A modular approach does indeed enable saving of time, but cannot be implemented within an IP module for insuring the minimum latency possible in a scheme that is aimed exclusively at optimizing the timing. Representative of the relevant art are U.S. Pat. Nos. 6,834,378 and 6,956,424.

SUMMARY OF THE INVENTION

In the context of a digital system, whenever there is a handshake, i.e., a communication between a transmitter (initiator) and a receiver (target), it is important to have a good timing closure between the two parts of the system. For example, there is a need to free the design, and hence the use of a generic IP module that is to communicate with a bus system, from the strict timing constraints of the bus system. This enables timing closure problems to be addressed when IP schemes are integrated with a complex bus system. A pipeline approach and a FIFO scheme may both be prepared and optimized from a performance standpoint.

An object of the present invention is to satisfy the needs outlined above. Various embodiments may address integration problems at an ASIC level linked to the timing closure in the case of a generic initiator connected in an interconnection scheme of a System-on-Chip (SoC). In particular, this is in a context where an initiator, such as a generic IP, accesses the bus in an efficient way by transmitting a well-defined burst on the bus without delay.

Various embodiments may take into account the needs linked to the use of a grant-control signal obtained by an arbiter of a combination type that is to decide which initiator access is to be granted. At the same time, it may enable a timing closure with a clock frequency that is as high as possible.

In various embodiments, the condition may also be managed in which the interconnection is not able to receive the traffic already present in a continuous flow. This may be done by reducing this longer path linked to the interconnection. At the same time this avoids the use of an additional FIFO, but instead uses a straightforward approach. The approach is easy to control and can be used in each integration step, i.e., at a front-end step and at a back-end step, and even in a situation where it is necessary to remedy an important situation immediately.

In various embodiments, the ACK (acknowledgement) signal provides exchange information used by a target for communicating its availability to receive a data flow. The need to have a timing closure on the ASIC chip for this (delayed) signal coming from an interconnect or from a target device (for example, memory controllers of a peripheral) enables adoption of a straightforward approach for control of each sub-system in which the handshake signal is managed.

Various embodiments are applicable to new technologies in which the wire congestion due to the ever-increasing number of cells connected increases the length of the connections.

Various embodiments may enable a good timing closure to be obtained between the two parts of the system. The process of transmission can be, for example, a FIFO. The grant signal from the receiver may be used for increasing the read pointer of the FIFO. If the pointer is of a high value, with a FIFO that has numerous locations, the grant signal has in general a path that is quite long before the first register is reached. Various approaches described herein enable the transmitter to manage the grant signal, thus avoiding introduction of a lengthened digital path.

Various embodiments may be used in the framework of a communication protocol of a request-grant (RG) type. However, the approach described herein can be applied in any system in which there is a grant of a request furnished via a digital circuit, and in which the timing of the grant signal is managed via a digital circuit.

The approach described herein enables numerous advantages to be achieved, such as a simpler design scheme. There may be a lower occupation of area plug-in of a generic IP on an interconnect. The point of compromise may be controlled between occupation of area and maximum frequency that can be achieved in a bus system by increasing, if necessary, the number of the finite-state machines (FSMs) to reduce loading thereof by a number of given multiplexers. The limits of frequency that can be achieved in a bus system in which the ACK signal is the lowest signal supplied can be identified. The structure may be implemented when the chip is developed, likewise enabling development in any language without requiring considerable debugging activity.

BRIEF DESCRIPTION OF THE DRAWINGS

The invention will now be described, purely by way of non-limiting examples with reference to the annexed drawings, wherein.

DETAILED DESCRIPTION OF THE PREFERRED EMBODIMENTS

In the ensuing description, various specific details are illustrated to provide an in-depth understanding of the embodiments. The embodiments can be obtained without one or more of the specific details, or with other methods, components, materials, etc. In other cases, well-known structures, materials, or operations are not illustrated or described in detail so as not to render various aspects of the embodiments obscure.

Reference to "an embodiment" or "one embodiment" in the framework of this description indicates that a particular configuration, structure or characteristic described in relation to the embodiment is included in at least one embodiment. Hence, phrases such as "in an embodiment" or "in one embodiment" that may be present in different parts of this description do not necessarily refer to the same embodiment. Furthermore, particular conformations, structures or characteristics can be combined in an adequate way in one or more embodiments. The references used herein are only adopted for reasons of convenience, and hence do not define the sphere of protection or the scope of the embodiments.

Figure 1:
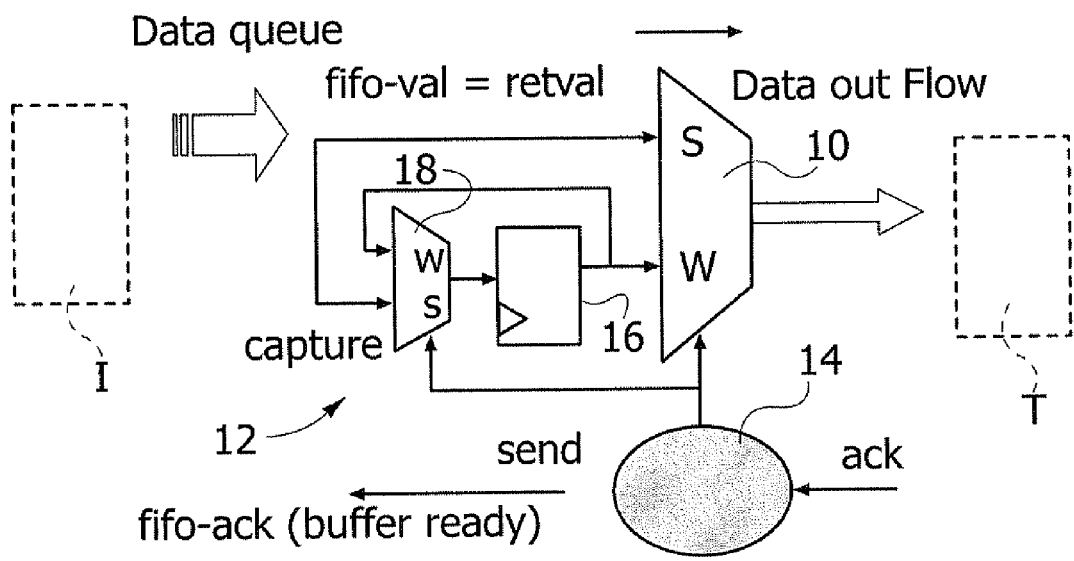
FIG. 1 is a block diagram of an embodiment of a device in accordance with the present invention.

FIG. 1 is a block diagram of a device that is to perform fundamentally an interface role that receives at input a data flow, viewed in general as a data queue. The data queue, organized according to a general FIFO (first-in first-out) scheme, for instance, can come from a transmitter device I having an initiator function, for example. The device/interface of FIG. 1 generates at its output a data flow that is to be transmitted via a bus to a target receiver T (for example, an interconnect or a memory controller), within the framework of a System-on-Chip or SoC, for example.

The output data flow presents at the output of a multiplexer 10 an output signal, the characteristics of which will be described more fully below. The multiplexer 10 receives the input signal on its input S, or a version of the signal frozen (or buffered) on its other input W, via a buffer circuit 12.

The operating condition of the multiplexer 10 (i.e., the fact that the output signal corresponds either to the input S or to the input W) is determined by a finite-state machine (FSM). In one embodiment, the finite-state machine is a Moore finite-state machine.

In the embodiment exemplified herein, the circuit 12 comprises an element 16 with memory functions, for example, a flip-flop. The output of the element 16 is connected to the input W of the multiplexer 10.

The output of the element 16 is also brought to one of the inputs of an additional multiplexer 18, which also has two inputs. These two inputs are designated, respectively, by w and s, and are to receive the input signal having the function of capture (input s), and the output of the flip-flop 16 fed back to the input of the multiplexer 18 (input w).

The operating condition of the multiplexer 18 (i.e., which of the two inputs s, w is sent at the output of the multiplexer 18, and hence at the input to element 16, cascaded to the multiplexer 18) is once again determined by the finite-state machine 14.

In regards to the general criteria of operation, the diagrams of FIGS. 1 and 4 can be considered substantially equivalent to one another, as will be seen more clearly below. The two embodiments differ from one another, and in particular, in regards to the organization of the finite-state machine 14.

Regardless of the scheme that is adopted, the approach described herein has an intrinsically straightforward structure that can be obtained with different technologies (RTL or spare-cell connections), and is best used in the initial stage of a CMOS technological flow.

The embodiments described herein reduce to a minimum use of the signal ACK arriving from the target T so as to not introduce delays linked to the presence of further buffer cells needed to fan-out the cell in relation to the signal.

In the embodiments described herein, the finite-state machine 14 is a Moore finite-state machine that uses two or three states. The choice of a Moore finite-state machine is linked to the fact that, in the embodiments considered herein, the finite-state machine uses actions at input (i.e., the output depends upon the state of the machine).

The ACK signal is used by the finite-state machine 14 and not by the FIFO at input. In the embodiment of FIG. 1, the two states of the machine 14 are used for choosing two different data paths. The first is the direct normal flow that passes through the input S of the multiplexer 10. The second is the data path that passes (towards the input W of the multiplexer 10) through the function of a memory or freeze or buffered location expressed by the buffer circuit or network 12.

The buffer circuit or network 12 is used for storing a copy of the data, which can be used in the case where the target T is busy, thus preventing a latency cycle in sending of the data whenever the target T is busy, enabling updating of the output data of the FIFO. In particular, use of the ACK signal for updating the memory location is avoided.

The state machine 14 supplies a signal for selecting the input of the multiplexer 10 (and also of the additional multiplexer 18 to enable recycling of the signal captured through the element 16) due to a signal generated without the state machine itself having a direct relationship with the ACK signal coming from the target T.

The diagram of FIG. 1 shows the emission, by the finite-state machine 14, of a signal referred to as FIFO-ACK. This signals the availability of the buffer (buffer ready) to enable updating of the FIFO data from the input queue.

Figure 2:
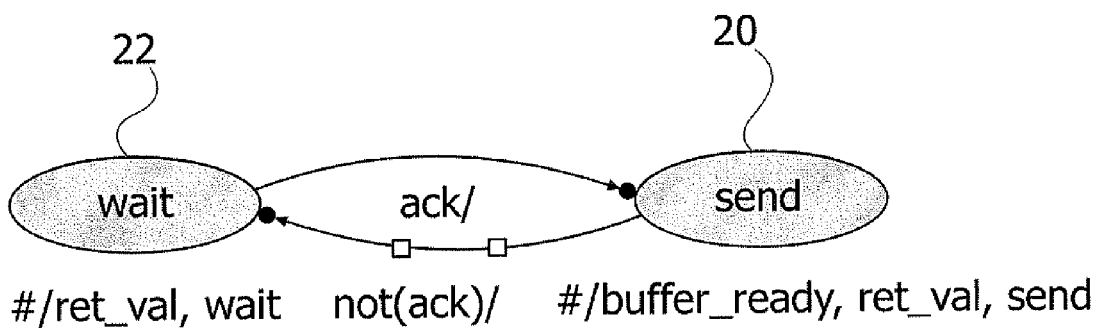
FIG. 2 is a representation of a state machine that can be used in the diagram of FIG. 1.

In the specific case represented in FIG. 2, the machine 14 has two states designated by send and wait, and the passage from one state to the other is linked to the reception of the ACK signal (ack/) from the target T.

In particular, the reception of the signal ack/ (indicating that the target T is available) sends the machine from the wait state 22 to the send state 20. In this state, the state machine 14 controls the multiplexer 10 to enable direct passage of the signal at input (Data queue) to the output of the multiplexer 10 (Data out Flow). At the same time, the multiplexer 18 via the input s captures the next input data.

The failure to receive the ACK signal (expressed as not (ack)/) sends, instead, the machine into the wait state 22. This causes the data to be frozen or buffered in the network or circuit 12, since the target T is not available at the moment.

The approach represented in FIGS. 1 and 2 can be adopted in the case where there is a continuous flow coming from the FIFO at the input. In these conditions, the control signal for validating the data (FIFO val) is always asserted, but can be connected directly to the validation signal of the FIFO. This leads to a loss of some advantages linked to interruption of the path.

Figure 3:
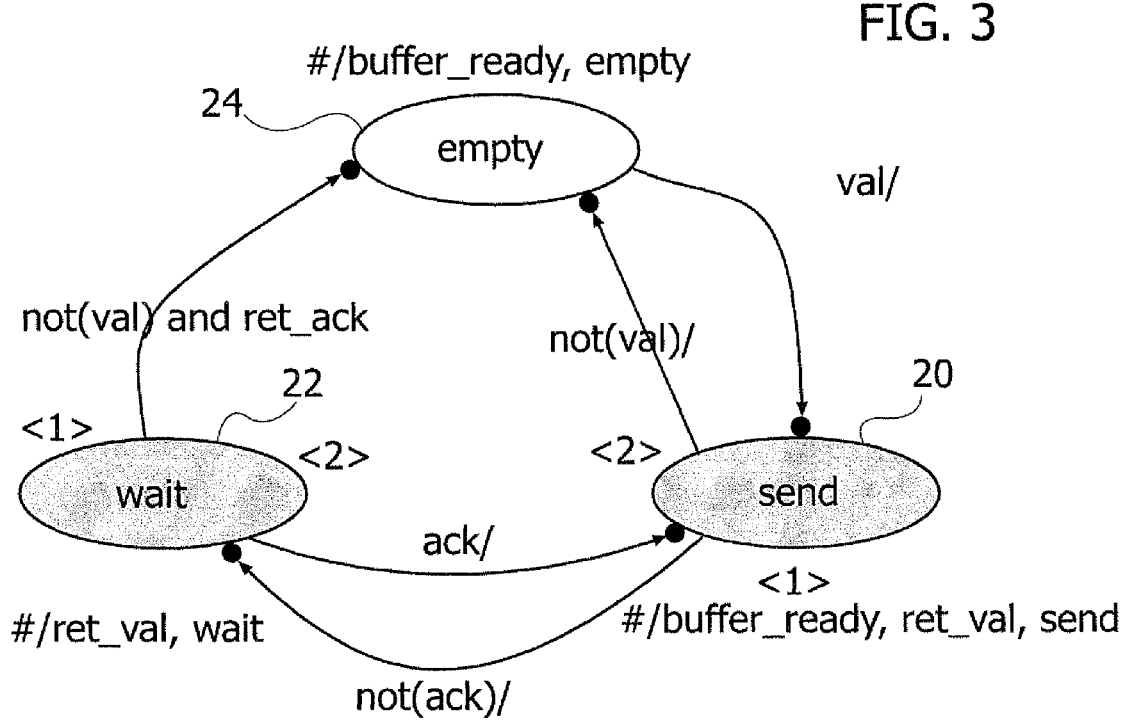
FIG. 3 represents a possible development of the state machine of FIG. 2.
Figure 4:
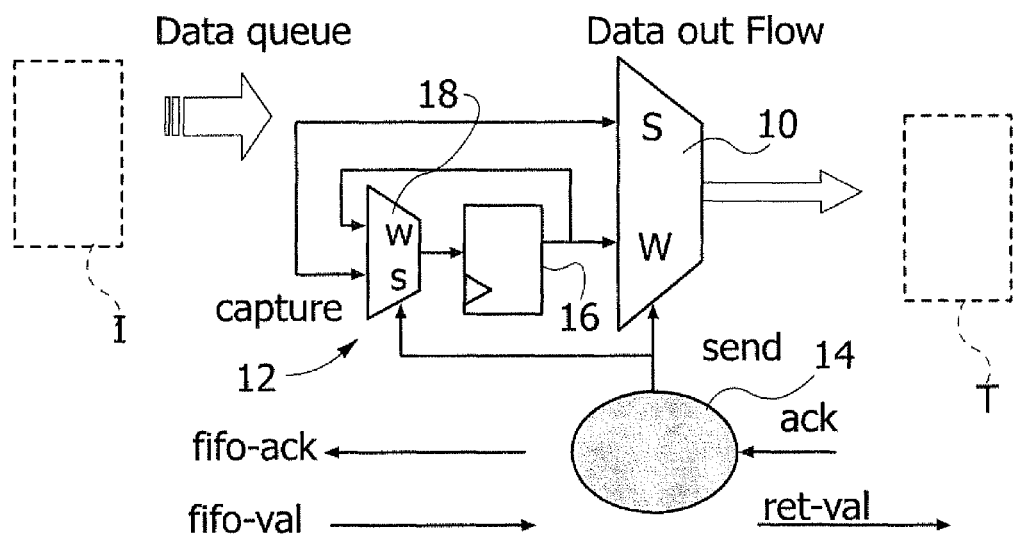
FIG. 4 illustrates an embodiment that is able to use the state machine of FIG. 3.

The embodiments of FIGS. 3 and 4 refer to a finite-state machine 14 comprising, in addition to the states 20 and 22 already described previously, a further state of inactivity (empty state) 24 that is to be asserted when no data is present in the freeze or buffered location buffer circuit 12 while, at the same time, no data is available in the FIFO.

This approach can be adopted when the output path of the FIFO, in terms of a validation-control signal and a data-path signal, may present problems in terms of the closing time. In particular, there is a problem when the number of locations is high. The use of a more complex three-state machine 14 enables use of a reclocking signal pre-sampled (in the previous cycle) by the validation signal val (ret val) that is to be asserted when the empty state (i.e., the state 24) is active.

The diagram of FIG. 3 highlights how the passage from the wait state 22 to the empty state 24 is obtained as a result of the simultaneous condition not(val) (i.e., absence of a validation signal) in combination (logic product) with the presence of the signal ret_ack (and of the signal ack/).

It will be appreciated that the signal ret_ack is high when the freeze or buffered location cell 12 is available for receiving new data. This is always true when the ACK signal is asserted.

It will likewise be appreciated that the transition between the state 22 and the state 24 occurs in one direction only, i.e., from the state 22 to the state 24, and not vice-versa.

The transition from the state 24 to the state 20 occurs upon reception of the validation signal val/, whereas the transition between the state 20 and the state 24 occurs in the absence of the validation signal (i.e., in the condition that can be expressed as not(val)/.

Of course, without prejudice to the principle of the invention, the details of implementation and the embodiments may vary, even significantly, with respect to what is illustrated herein purely by way of non-limiting examples. This is without departing from the scope of the invention, as defined by the annexed claims.

That which is claimed:

1. A device for transferring data from an input queue to an output flow towards a target, the device comprising:
   a buffer network configured to buffer the data when the target is not available to receive the data;
   a multiplexer configured to switch between a first operating condition to direct towards the target the data from the input queue, and a second operating condition to direct towards the target the data from the buffer network; and
   a finite state machine configured to selectively switch said multiplexer between the first and second operating conditions as a function of an acknowledgement signal received from the target, the acknowledgement signal indicating availability of the target to receive data;
   said buffer network comprising a second multiplexer configured to switch under control of said finite state machine between a capture condition of new data from the input queue and a recycling condition of data captured from the input queue as a function of the acknowledgement signal.

2. The device of claim 1, wherein said finite state machine comprises a Moore-type finite state machine.

3. The device of claim 1, wherein said finite state machine includes a send state to drive said multiplexer in the first operating condition, and a wait state to drive said multiplexer in the second operating condition.

4. The device of claim 3, wherein said finite state machine further includes an idle state for when the target is available to receive the data but there is no data in the input queue.

5. The device of claim 1, wherein said buffer network further comprises:
   a store element configured to store the data captured from the input queue.

6. The device of claim 1, wherein said finite state machine is configured to drive said second multiplexer in the capture condition when said multiplexer transmits data from the input queue towards the target, and in the recycle condition when the acknowledgement signal indicates that the target is not available to receive input data.

7. A system-on-chip comprising:
   a transmitter configured to provide data;
   a target configured to receive the data; and
   an interface device between said transmitter and said target and configured to transfer data therebetween, said interface device comprising
      a buffer network configured to buffer the data when said target is not available to receive the data,
      a multiplexer configured to switch between a first operating condition to direct towards said target the data from said transmitter, and a second operating condition to direct towards the target the data from said buffer network, and
      a finite state machine configured to selectively switch said multiplexer between the first and second operating conditions as a function of an acknowledgement signal received from said target, the acknowledgement signal indicating availability of said target to receive data,
      said buffer network comprising a second multiplexer configured to switch under control of said finite state machine between a capture condition of new data from the input queue and a recycling condition of data captured from the input queue as a function of the acknowledgement signal.

8. The system-on-chip of claim 7, wherein said finite state machine comprises a Moore-type finite state machine.

9. The system-on-chip of claim 7, wherein said target comprises at least one of an interconnect and a memory controller.

10. The system-on-chip of claim 7, wherein said finite state machine includes a send state to drive said multiplexer in the first operating condition, and a wait state to drive said multiplexer in the second operating condition.

11. The system-on-chip of claim 10, wherein said finite state machine further includes an idle state for when said target is available to receive the data but there is no data at said transmitter.

12. The system-on-chip of claim 7, wherein said buffer network further comprises:
    a store element configured to store the data captured from the input queue.

13. The system-on-chip of claim 7, wherein said finite state machine is configured to drive said second multiplexer in the capture condition when said multiplexer transmits data from said transmitter towards said target, and in the recycle condition when the acknowledgement signal indicates that said target is not available to receive input data.

14. A method of transferring data from an input queue to an output flow towards a target, the method comprising:
    buffering the data in a buffer network when the target is not available to receive data;
    directing towards the target the data from the input queue in a first operating condition;
    directing towards the target the buffered data from the buffer network in a second operating condition; and
    selectively switching between the first and second operating conditions as a function of an acknowledgement signal received from the target, the acknowledgement signal indicating availability of the target to receive data;

the buffering comprising switching the buffer network between a capture condition of new data from the input queue and a recycling condition of data captured from the input queue as a function of the acknowledgement signal.

15. The method of claim 14, wherein a finite state machine is used for selectively switching between the first and second operating conditions.

16. The method of claim 15, wherein the finite state machine comprises a Moore-type finite state machine.

17. The method of claim 15, wherein a multiplexer is used for directing between the first and second operating conditions; and wherein the finite state machine includes a send state to drive the multiplexer in the first operating condition and a wait state to drive the multiplexer in the second operating condition.

18. The method of claim 15, wherein the finite state machine further includes an idle state for when the target is available to receive the data but there is no data in the input queue.

19. The method of claim 18, wherein the buffer network comprises a store element for storing the data captured from the input queue; and a second multiplexer for switching under control of the finite state machine between the capture condition of new data from the input queue and the recycling condition of data stored in the store element.

20. The method of claim 19, wherein the finite state machine drives the second multiplexer in the capture condition when the multiplexer transmits data from the input queue towards the target, and in the recycling condition when the acknowledgement signal indicates that the target is not available to receive input data.

21. A method for operating a system-on-chip comprising a transmitter, a target, and an interface device therebetween, the method comprising operating the transmitter to provide data;

operating a target to receive the data; and operating the interface device to transfer data from the transmitter to the target based on buffering the data in a buffer network when the target is not available to receive data, directing towards the target the data from the transmitter in a first operating condition, directing towards the target the buffered data from the buffer network in a second operating condition, and selectively switching between the first and second operating conditions as a function of an acknowledgement signal received from the target, the acknowledgement signal indicating availability of the target to receive data, the buffering comprising switching the buffer network between a capture condition of new data and a recycling condition of data captured from an input queue as a function of the acknowledgement signal.

22. The method of claim 21, wherein a finite state machine is used for selectively switching between the first and second operating conditions.

23. The method of claim 22, wherein the finite state machine comprises a Moore-type finite state machine.

24. The method of claim 21, wherein the target comprises at least one of an interconnect and a memory controller.

25. The method of claim 22, wherein a multiplexer is used for directing between the first and second operating conditions; and wherein the finite state machine includes a send state to drive the multiplexer in the first operating condition and a wait state to drive the multiplexer in the second operating condition.

26. The method of claim 22, wherein the finite state machine further includes an idle state for when the target is available to receive the data but there is no data in the input queue.

27. The method of claim 26, wherein the buffer network comprises a store element for storing the data captured from the input queue; and a second multiplexer for switching under control of the finite state machine between the capture condition of new data from the input queue and the recycling condition of data stored in the store element.

28. The method of claim 27, wherein the finite state machine drives the second multiplexer in the capture condition when the multiplexer transmits data from the input queue, towards the target, and in the recycling condition when the acknowledgement signal indicates that the target is not available to receive input data.

* * * * *